(12) United States Patent
Pan

(10) Patent No.: US 10,010,221 B2
(45) Date of Patent: Jul. 3, 2018

(54) BLENDER WITH ACTUATION ARRANGEMENT

(71) Applicant: Guangshe Pan, Brea, CA (US)

(72) Inventor: Guangshe Pan, Brea, CA (US)

( * ) Notice: Subject to any disclaimer, the term of this patent is extended or adjusted under 35 U.S.C. 154(b) by 136 days.

(21) Appl. No.: 14/819,309

(22) Filed: Aug. 5, 2015

(65) Prior Publication Data
US 2017/0035250 A1     Feb. 9, 2017

(51) Int. Cl.
*A47J 43/07* (2006.01)
*B01F 13/04* (2006.01)

(52) U.S. Cl.
CPC ......... *A47J 43/0761* (2013.01); *B01F 13/045* (2013.01); *B01F 13/047* (2013.01)

(58) Field of Classification Search
CPC .. A47J 43/046; A47J 43/0766; A47J 43/0761; B01F 13/047; B01F 13/045
USPC .................................. 366/205, 206; 241/37.5
See application file for complete search history.

(56) References Cited

U.S. PATENT DOCUMENTS

| | | | | |
|---|---|---|---|---|
| 4,174,073 | A * | 11/1979 | Maher | A47J 43/046 241/282.1 |
| 6,817,750 | B1 * | 11/2004 | Sands | A47J 19/027 366/205 |
| 7,066,640 | B2 * | 6/2006 | Sands | A47J 19/027 366/205 |
| 7,407,320 | B1 * | 8/2008 | Lin | A47J 43/0777 241/37.5 |
| 7,441,944 | B2 * | 10/2008 | Sands | A47J 43/046 366/205 |

FOREIGN PATENT DOCUMENTS

WO    WO 2007068627 A1 *  6/2007  .......... A47J 43/0766

* cited by examiner

*Primary Examiner* — Walter D. Griffin
*Assistant Examiner* — Marc C Howell
(74) *Attorney, Agent, or Firm* — Tsz Lung Yeung

(57) ABSTRACT

A blender includes a base unit having a receiving well, a container assembly and an actuation arrangement. The container assembly includes a container body having a blending cavity and a rim, and a connector member detachably attached on the container body to selectively seal the blending cavity, a driven unit and a blending blade. The actuation arrangement includes a plurality of actuating members outwardly extended from the rim of the container body, a plurality of actuating slots indently and spacedly formed along a side wall of the receiving well, and a plurality of actuating switches. When the connector member is slightly rotated in the receiving well, each of the actuating members is arranged to circumferentially move along the corresponding actuating slot so as to actuate the actuating switches for actuating the driving head to rotate.

15 Claims, 7 Drawing Sheets

US 10,010,221 B2

BLENDER WITH ACTUATION ARRANGEMENT

BACKGROUND OF THE PRESENT INVENTION

Field of Invention

The present invention relates to a blender, and more particularly to a blender comprising a secure actuation arrangement which allows convenient and easy actuation of the blender when a container assembly of the blender is slightly rotated.

Description of Related Arts

A blender usually comprises a base unit and a container assembly received in the base unit. The base unit usually has a driving unit received therein. A receiving well is indently formed on the base unit for receiving the container assembly. The driving unit usually comprises a driving head to be rotatably provided in a bottom surface of the receiving well.

On the other hand, the container assembly usually comprises a container body having a container cavity, a rotating blade rotatably provided in the container body, and a connecting unit connected between the driving unit and the rotating blade. The connecting unit is also detachably connected to the container body so that a user may detach the connecting unit from the container body and access the container cavity.

In order to operate the above-mentioned conventional blender, the container assembly must be fit and secured into the receiving well so that when the rotating blade is driven to rotate in the container cavity, the container assembly can be well supported and secured by the base unit. An ill-supported container assembly may cause the container assembly to accidentally fall off from the base unit and cause injury to the people nearby.

On the other hand, in order to activate the blender, a switch may be provided on the base unit. When the container assembly is engaged with the base unit, a user may operate on the switch to turn on the blender. However, in the case that the container assembly is improperly engaged with the base unit, turning on the blender may cause the container assembly to fall off the base unit.

SUMMARY OF THE PRESENT INVENTION

An objective of the present invention is to provide a blender which comprises a secure actuation arrangement which allows convenient and easy actuation of the blender when a container assembly of the blender is slightly rotated.

Another objective of the present invention is to provide a blender which comprises a secure actuation arrangement, wherein when the container assembly is rotated to actuate the actuating switches, the container assembly is also arranged to be securely engaged with a base unit so that accidental disengagement between the container assembly and the base unit can be prevented.

In one aspect of the present invention, it provides a blender, which comprises:

a base unit which comprises a base body having a receiving well, a driving unit received in the base body, and a driving head connected to the driving unit and rotatably provided in the receiving well;

a container assembly, which comprises:

a container body having a blending cavity and a rim, the container body being sized to fittedly receive in the receiving well;

a connector member detachably attached on the container body to selectively seal the blending cavity, the connector member being sized to receive in the receiving well;

a driven unit operatively provided on a bottom side of the connector member, the driven unit being arranged to engage with the driving head; and a blending blade provided on a top side of the connector member, the blending blade being connected to the driven unit so that when the driven unit is driven to rotate, the blending blade is also driven to rotate in the blending cavity; and an actuation arrangement, which comprises:

a plurality of actuating members outwardly extended from the rim of the container body;

a plurality of actuating slots indently and spacedly formed along a side wall of the receiving well, the actuating members being received in the actuating slots respectively; and a plurality of actuating switches electrically connected to the driving unit and received in the actuating slots respectively, in such a manner that when the connector member is slightly rotated in the receiving well, each of the actuating members is arranged to circumferentially move along the corresponding actuating slot so as to actuate the actuating switches for actuating the driving head to rotate.

DETAILED DESCRIPTION OF THE PREFERRED EMBODIMENT

Figure 1:
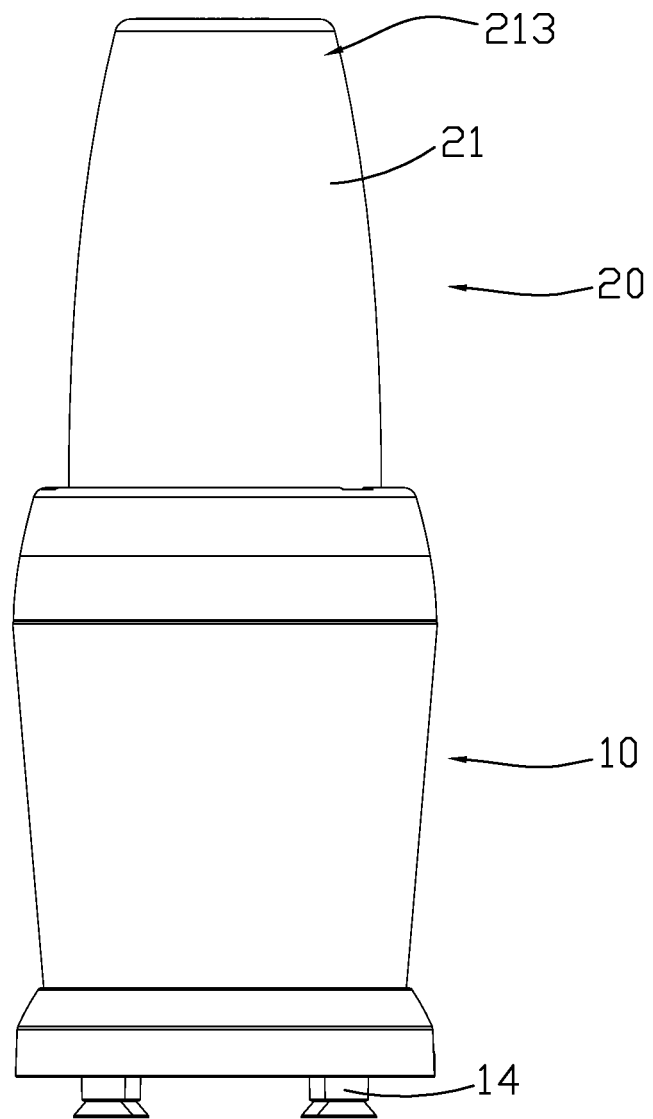
FIG. 1 is a side view of a blender according to a preferred embodiment of the present invention.
Figure 2:
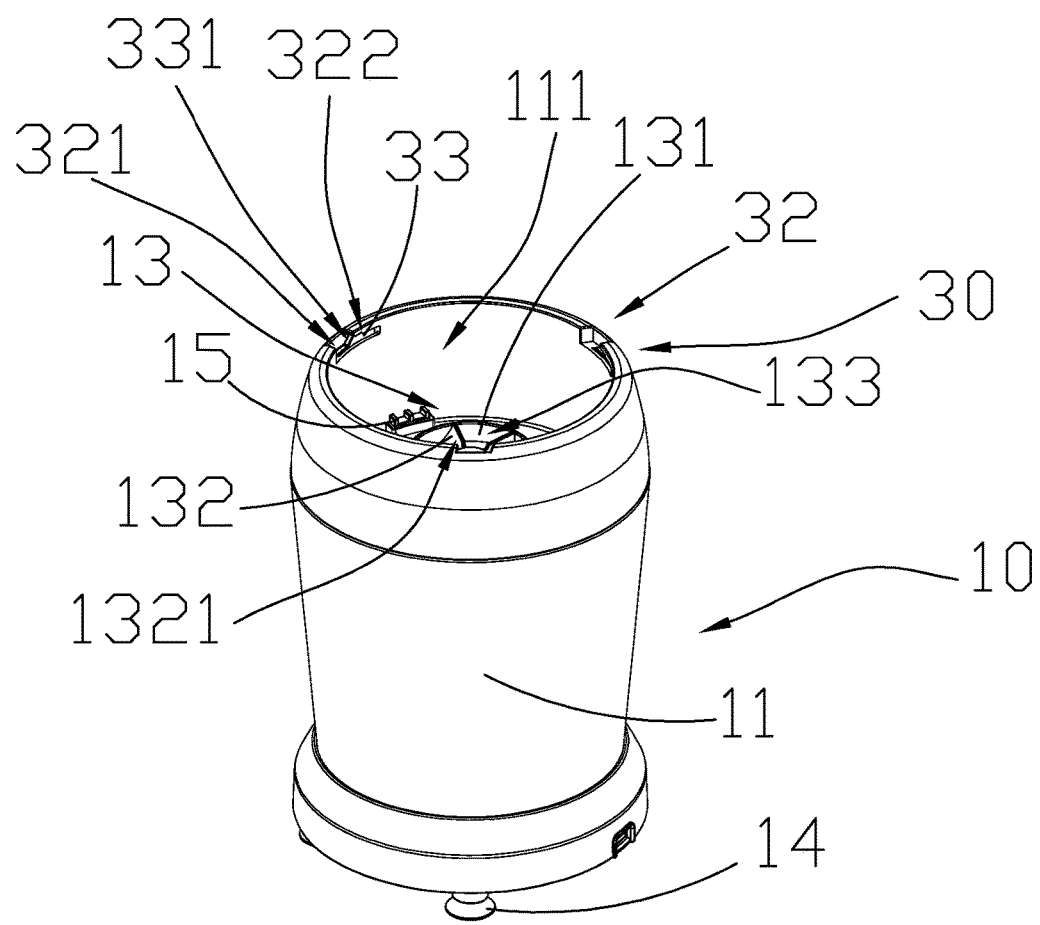
FIG. 2 is a perspective view of a base unit of the blender according to the preferred embodiment of the present invention.
Figure 3:
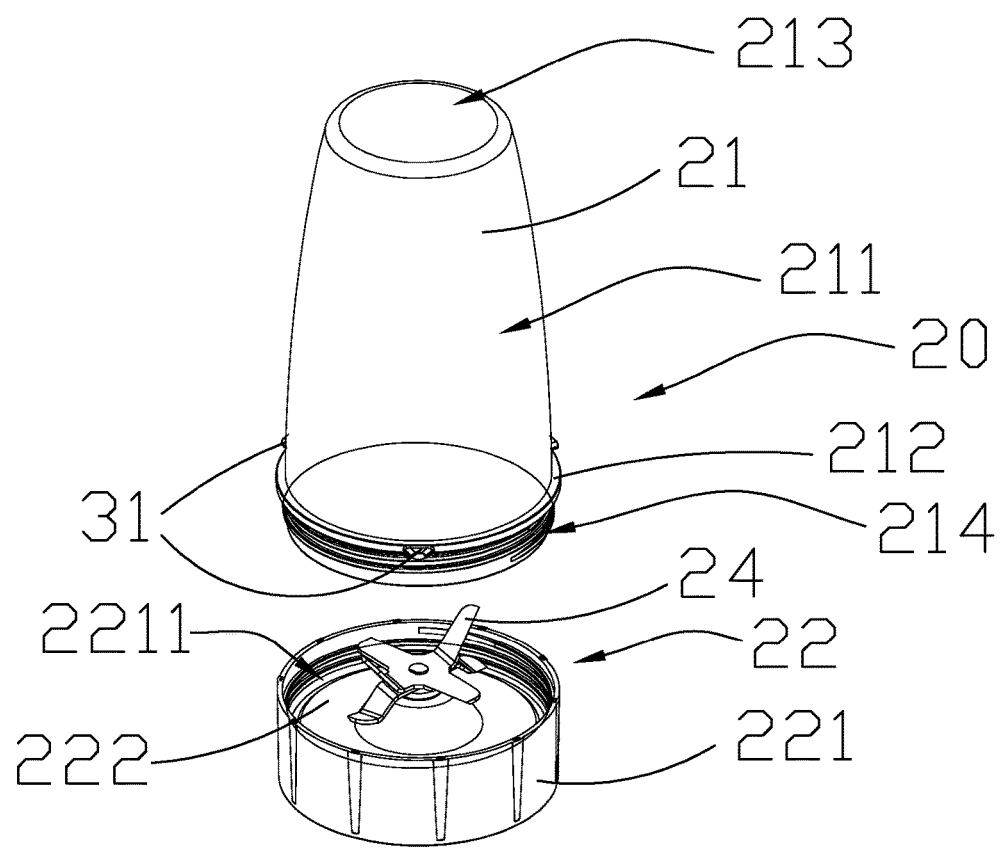
FIG. 3 is an exploded perspective view of a container assembly of the blender according to the preferred embodiment of the present invention.
Figure 4:
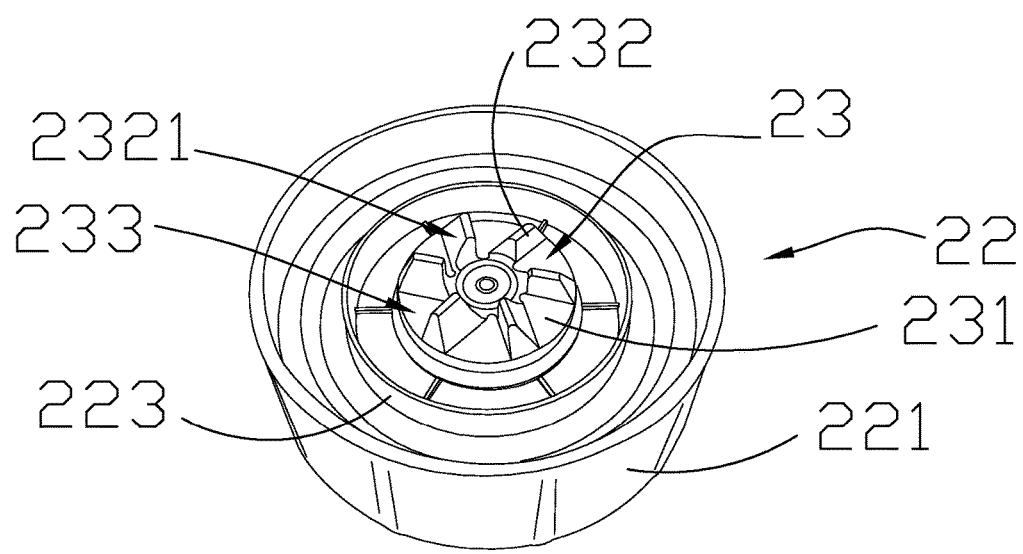
FIG. 4 is a perspective view of a connector member of the blender according to the preferred embodiment of the present invention.
Figure 5:
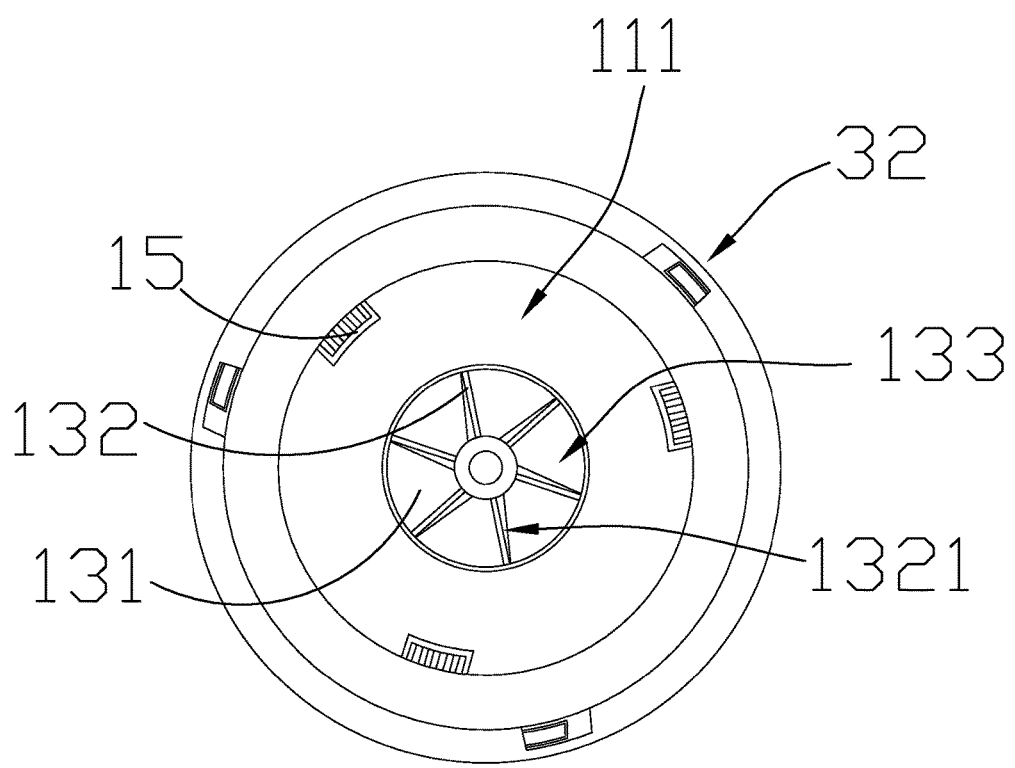
FIG. 5 is a schematic diagram of a driving unit of the blender according to the preferred embodiment of the present invention.

The following detailed description of the preferred embodiment is the preferred mode of carrying out the invention. The description is not to be taken in any limiting sense. It is presented for the purpose of illustrating the general principles of the present invention.

Referring to FIG. 1 to FIG. 7 of the drawings, a blender according to a preferred embodiment of the present invention is illustrated. Broadly, the blender 1 may comprise a base unit 10, a container assembly 20, and an actuation arrangement 30.

The base unit 10 may comprise a base body 11 having a receiving well 111, a driving unit 12 received in the base body 11, and a driving head 13 connected to the driving unit 12 and rotatably provided in the receiving well 111.

The container assembly 20 may comprise a container body 21, a connector member 22, a driven unit 23, and a blending blade 24. The container body 21 may have a blending cavity 211 and a rim 212. At least an open end portion of the container body 21 is sized and shaped to fittedly receive in the receiving well 111.

The connector member 22 may be detachably attached on the container body 21 to selectively seal the blending cavity 211. Moreover, the connector member 22 may be sized shaped to receive in the receiving well 111.

The driven unit 23 may be operatively provided on a bottom side of the connector member 22, and may be arranged to engage with the driving head 13, so that when the driving head 13 is driven to rotate, the driven unit 23 is also driven to rotate.

The blending blade 24 may be provided on a top side of the connector member 22, and may be connected to the driven unit 23 so that when the driven unit 23 is driven to rotate, the blending blade 24 is also driven to rotate in the blending cavity 211 for blending food items.

The actuation arrangement 30 may comprise a plurality of actuating members 31, a plurality of actuating slots 32, and a plurality of actuating switches 33. The actuating members 31 may be outwardly extended from the rim 212 of the container body 21. The actuating slots 32 may be indently and spacedly formed along a side wall of the receiving well 111, and may be received in the actuating slots 32 respectively.

On the other hand, the actuating switches 33 may be electrically connected to the driving unit 12 and may be received in the actuating slots 32 respectively, in such a manner that when the connector member 22 is slightly rotated in the receiving well 111, each of the actuating members 31 is arranged to circumferentially and sidewardly move along the corresponding actuating slot 32 so as to actuate the actuating switches 33 for actuating the driving head 13 to rotate.

According to the preferred embodiment of the present invention, the base unit 10 may further comprise a plurality of supporting legs 14 provided on a bottom side of the base body 11 for supporting the entire blender. The supporting legs 14 may be made of material having a relatively high coefficient of friction so as to support the weight of the entire blender, while preventing the blender from accidental slipping when it is operating. An exemplary material is rubber.

The base body 11 may have a generally circular cross sectional shape. The receiving well 111 may be indently formed on a top side of the base body 11 for fittedly receiving the container assembly 20. Thus, the receiving well 111 may communicate with an exterior of the base body 11. The base body 11 may further have a receiving cavity for receiving the driving unit 12. The receiving cavity may be essentially an enclosed cavity which is not normally exposed to an exterior of the base body 11. The base body 11 may be generally made of metallic material for ensuring that it has sufficient weight to securely support the container assembly 20. An exemplary material is stainless steel.

The base unit 10 may further comprise a plurality of supporting pieces 15 spacedly provided on a bottom surface of the receiving well 111 for providing cushion effect to the container assembly 20. Each of the supporting pieces 15 may be made of rubber material so that it possess a predetermined amount of elasticity for providing the cushion effect to the container assembly 20 when it is supported on top of the base unit 10. The supporting pieces 15 are utilized for normally biasing against a bottom side of the connector member 22 so that when it is supported in the receiving well 111, lateral movement and unwanted vibrations between the container assembly 20 and the base unit 10 may be minimized.

The driving unit 12 may be received in the base body 11. The driving unit 12 is arranged to deliver a rotational movement through the driving head 13. Thus, the driving unit 12 may be a motor for outputting the rotational movement. The driving head 13 may be provided on the bottom wall of the receiving well 111. The driving head 13 may comprise a driving wheel 131 and a plurality of driving members 132 spacedly formed and extended on the driving wheel 131 to divide the driving wheel 131 into a corresponding number of driving compartments 133.

The container body 21 of the container assembly 20 may be made of plastic material which may be transparent so that a user of the present invention may observe the events in the blending cavity 211. The container body 21 may have a closed end portion 213 and an opposed open end portion 214, wherein the rim 212 is circumferentially extended along a side surface of the open end portion 214 of the container body 21. Thus, the container body 21 may have a generally circular cross sectional shape which correspond to a cross sectional shape of the receiving well 111.

Figure 7:
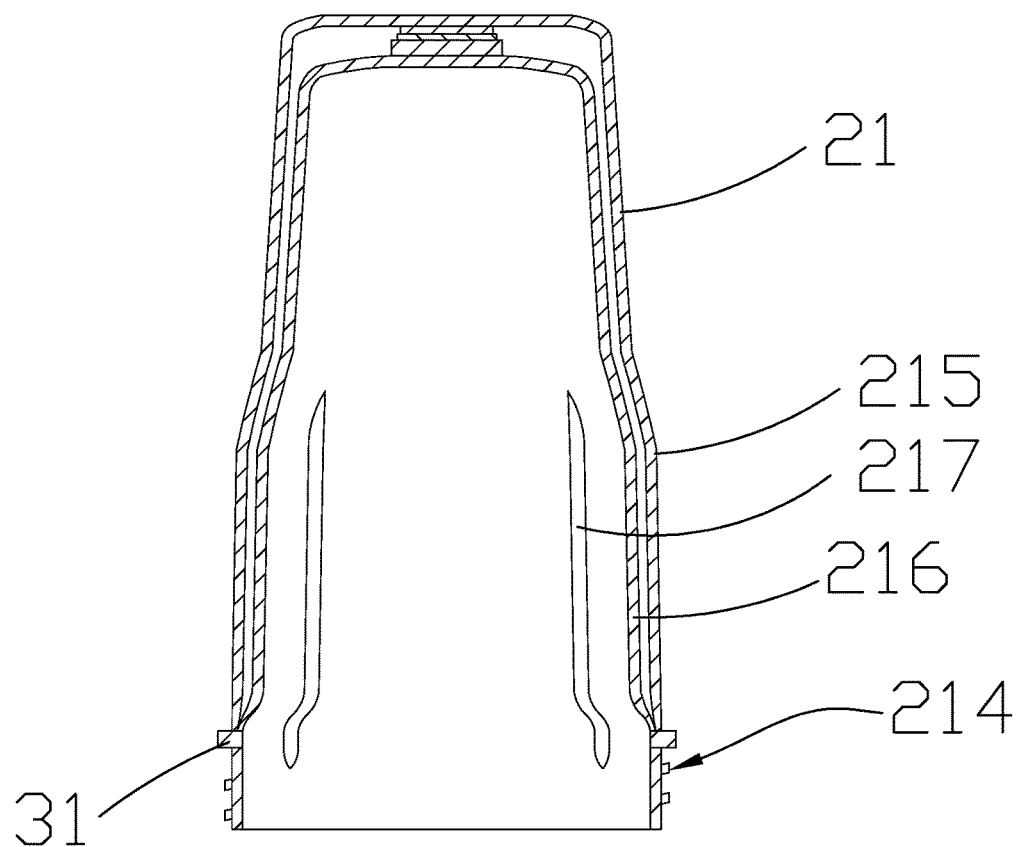
FIG. 7 is a schematic diagram illustrating a double wall structure of a container body according to the preferred embodiment of the present invention.

It is worth mentioning that the container body 21 may have a single wall structure in that the container body 21 is configured from plastic material which forms a single external wall. Alternatively, the container body 21 may form a double wall structure in that the container body 21 may comprise an external wall panel 215 and an internal wall panel 216 which is sealingly coupled with the external wall panel 215 for forming a double wall structure of the container body 21, as shown in FIG. 7 of the drawings. Furthermore, the container body 21 may further comprise a plurality of reinforcing members 217 longitudinally extended along an inner side surface of the internal wall panel 216 (or the single external wall if the container body 21 is a single wall structure) for reinforcing a structural integrity of the container body 21, and for enhancing a blending effect within the blending cavity 211.

The connector member 22 may comprise a circumferential wall 221 and a mid-support member 222 provided within the space formed by the circumferential wall 221.

The circumferential wall 221 may have a circular cross section for forming a ring-shaped structure. The mid-support member 222 is provided within the circumferential wall 221 for supporting the driven unit 23 and the blending blade 24. According to the preferred embodiment of the present invention, the blending blade 24 is supported on a top side of the mid-support member 222, while the driven unit 23 is supported on a bottom side of the mid-support member 222.

The driven unit 23 may comprise a driven panel 231 and a plurality of driven teeth 232 spacedly formed on the driven panel 231 to divide the driven panel 231 into a corresponding number of driven compartments 233, wherein the driving members 132 of the driving head 13 are arranged to accommodate in the driven compartments 233 respectively when the driving head 13 is engaged with the driven unit 23. Furthermore, each of the driven teeth 232 may have a slanted surface 2321 which is inclined to correspond to a slanted surface 1321 of the corresponding driving member 132 so that the driving members 132 may be capable of effectively driving the driven unit 23 to rotate when the driving head 13 is rotating.

The connector member 22 may further comprise a peripheral ring 223 formed on the bottom side of the mid-support member 222. The peripheral ring 223 may have a circular cross section having a diameter larger than that of the driven panel 231.

Moreover, the peripheral ring 223 may be concentrically provided with respect to the driven panel 231. The purpose of the peripheral ring 223 is to protect the driven unit 23 and the driving head 13 when they are engaged.

The open end portion 214 of the container body 21 may be threaded on an exterior surface thereof On the other hand, the circumferential wall 221 of the connector member 22 may have an inner threaded portion 2211 formed at a position above the mid-support member 222 for detachably connecting with the open end portion 214 of the container body 21.

The blending blade 24 is provided on the top side of the mid-support member 222 and is extended into the blending cavity 211 for blending food items received therein. The blending blade 24 may take a wide variety of shapes and forms.

The actuating members 31 of the actuation arrangement 30 may be outwardly and integrally extended from the rim 212 of the container body 21. Each of the actuating members 31 may be sized and shaped to accommodate in the corresponding actuating slot 32. Moreover, each of the actuating members 31 may be formed at the same level.

On the other hand, the actuating slots 32 of the actuation arrangement 30 may be formed and extended on a top inner edge portion of the receiving well 111. Each of the actuating slots 32 is positioned to correspond to a position of the corresponding actuating member 31. In this preferred embodiment, each of the actuating slots 32 may have an engagement portion 321 having a relatively greater height and an actuation portion 322 having a relatively smaller height. The engagement portion 321 of each of the actuating slots 32 may be accessible from a top side of the base body 11. In other words, the engagement portion 321 of each of the actuating slots 32 may have a top opening formed on the base body 11. The actuating slots 32 are formed at a same height with respect to a bottom surface of the receiving well 111.

Each of the actuating members 31 may be positioned to correspond to a position of the engagement portion 321 of the corresponding actuating slot 32 so that the actuating members 31 may be inserted into the engagement portions 321 of the actuating slots 32 respectively from the top of the base body 11.

Once the actuating members 31 are inserted into the engagement portions 321 of the actuating slots 32 respectively, the container assembly 20 may be slightly rotated toward the actuation portion 322 of the actuating slots 32 so as to sidewardly push the actuating members 31 into the corresponding actuation portions 322.

Figure 6:
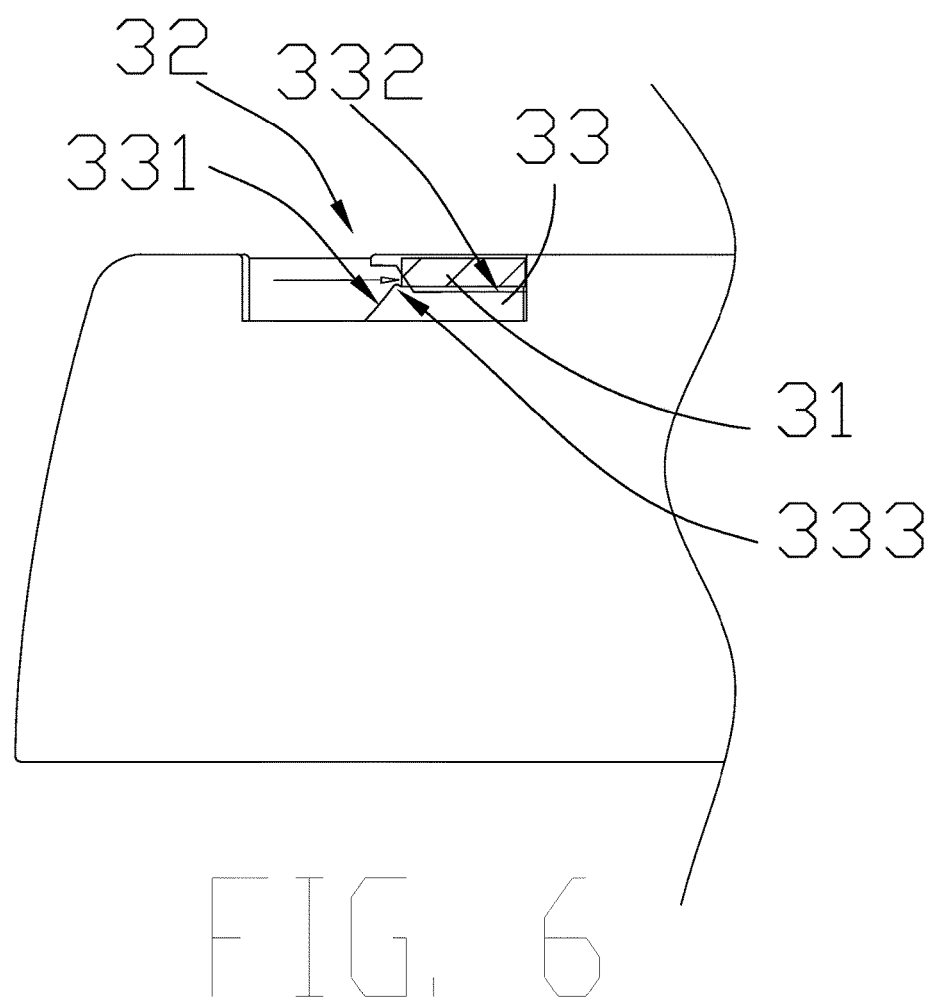
FIG. 6 is a side view of an actuating slot of the blender according to the preferred embodiment of the present invention.

As shown in FIG. 6 of the drawings, the actuating switches 33 of the actuation arrangement 30 may be provided in the actuation portion 322 of the actuating slots 32 respectively in such a manner that when the actuating members 31 are sidewardly pushed into the actuation portions 322, the actuating switches 33 are arranged to be actuated for actuation of the driving unit 12. In this preferred embodiment, each of the actuating members 31 are arranged to depress the corresponding actuating switch 33 for actuating the driving unit 12. Each of the actuating switches 33 may have an inclined surface 331 facing the corresponding actuating member 31 so that when the actuating member 31 is sidewardly pushed toward the actuating switch 33, the actuating switch 33 is arranged to be depressed with respect to the base unit 10. Each of the actuating switches 33 may further have a flat surface 332 and a bulging portion 333 formed between the inclined surface 331 and the flat surface 332. The bulging portion 333 forms a latch or a protrusion for preventing the actuating member 31 from accidentally moving back to the engagement portion 321 of the actuating slot 32 when the blender is operating.

A distance between the actuating slots 32 and the bottom surface of the receiving well 111 is substantially the same as that between the actuating members 31 and a bottom circumferential edge of the connector member 22 when it is attached on the container body 21.

It is worth mentioning that a height of the actuation portion 322 of each of the actuating slots 32 is slightly greater than a thickness of the corresponding actuating member 31 so that when the actuating members 31 are inserted into the actuation portions 322 respectively, an upward movement of the container assembly 20 is substantially restricted by the actuating members 31 and the container assembly 20 is secured on the base unit 10. At the same time, the actuating switches 33 are actuated for automatically blending the food items contained in the blending cavity 211.

When the blending process is completed, a user of the present invention may simply slightly rotate the container assembly 20 toward the direction of engagement portions 321 of the actuating slots 32. The user may then easily lift up the container assembly 20 because upward restriction of the actuating members 31 are removed.

The present invention, while illustrated and described in terms of a preferred embodiment and several alternatives, is not limited to the particular description contained in this specification. Additional alternative or equivalent components could also be used to practice the present invention.

What is claimed is:
1. A blender, comprising:
a base unit which comprises a base body having a receiving well, a driving unit received in said base body, and a driving head connected to said driving unit and rotatably provided in said receiving well;
a container assembly, which comprises:
a container body having a blending cavity and a rim, said container body being sized to fittedly receive in said receiving well;
a connector member detachably attached on said container body to selectively seal said blending cavity, said connector member being sized to receive in said receiving well;
a driven unit operatively provided on a bottom side of said connector member, said driven unit being arranged to engage with said driving head; and
a blending blade provided on a top side of said connector member, said blending blade being connected to said driven unit so that when said driven unit is driven to rotate, said blending blade is also driven to rotate in said blending cavity; and
an actuation arrangement, which comprises:
a plurality of actuating members outwardly extended from said rim of said container body,
a plurality of actuating slots indently and spacedly formed along a side wall of said receiving well at a top inner edge portion thereof, said actuating members being received in said actuating slots respectively, each of said actuating slots having an engagement portion having a relatively greater height and an actuation portion having a relatively smaller height, said engagement portion of each of said actuating slots having a top opening so that said engagement portions are accessible from a top side of said base body; and a plurality of actuating switches electrically connected to said driving unit and entirely received in said actuation portions of said actuating slots respectively, in such a manner that said actuating switches being in idle position before said driving unit is actuated, and when said connector member is rotated in said receiving well, each of said actuating members is arranged to circumferentially and sidewardly move along said corresponding actuating slot from said engagement portion to said actuation portion to directly engage with and automatically actuate said actuating switches so as to actuate said driving unit and said driving head to rotate after said actuating members are moved circumferentially and sidewardly in said actuating slot, each of said actuating switches having an inclined surface, a flat surface and a bulging portion formed between said slanted surface and said flat surface, said bulging portion forming a protrusion for preventing said corresponding actuating member from accidentally moving back to said corresponding engagement portion when said driving unit is actuated.

2. The blender, as recited in claim 1, wherein each of said actuating members is positioned to correspond to a position of said engagement portion of said corresponding actuating slot so that said actuating members are capable of being inserted within said engagement portions of said actuating slots respectively from a top side of said base body.

3. The blender, as recited in claim 2, wherein a height of said actuation portion of each of said actuating slots is greater than a thickness of said corresponding actuating member so that when said actuating members are inserted into said actuation portions respectively, an upward movement of said container assembly is substantially restricted by said actuating members, while said actuating switches are actuated automatically.

4. The blender, as recited in claim 3, wherein said driving head comprises a driving wheel and a plurality of driving members spacedly formed and extended on said driving wheel to divide said driving wheel into a corresponding number of driving compartments.

5. The blender, as recited in claim 4, wherein said connector member comprises a circumferential wall and a mid-support member provided within a space formed by said circumferential wall, said circumferential wall having a circular cross section for forming a ring-shaped structure, said mid-support member being provided within said circumferential wall for supporting said driven unit and said blending blade, said blending blade being supported on a top side of said mid-support member, while said driven unit being supported on a bottom side of said mid-support member.

6. The blender, as recited in claim 5, wherein said driven unit comprises a driven panel and a plurality of driven teeth spacedly formed on said driven panel to divide said driven panel into a corresponding number of driven compartments, wherein said driving members of said driving head are arranged to accommodate in said driven compartments respectively when said driving head is engaged with said driven unit.

7. The blender, as recited in claim 6, wherein each of said driven teeth has a slanted surface which is inclined to correspond to a slanted surface of said corresponding driving member so that said driving members is capable of effectively driving said driven unit to rotate when said driving head rotates.

8. The blender, as recited in claim 7, wherein said connector member further comprises a peripheral ring formed on said bottom side of said mid-support member, said peripheral ring having a circular cross section and a diameter larger than that of said driven panel, said peripheral ring being concentrically provided with respect to said driven panel.

9. The blender, as recited in claim 1, wherein said base unit further comprises a plurality of supporting pieces spacedly provided on a bottom surface of said receiving well.

10. The blender, as recited in claim 3, wherein said base unit further comprises a plurality of supporting pieces spacedly provided on a bottom surface of said receiving well.

11. The blender, as recited in claim 8, wherein said base unit further comprises a plurality of supporting pieces spacedly provided on a bottom surface of said receiving well.

12. The blender, as recited in claim 3, wherein said container body has a single external wall for forming said blending cavity within said single external wall.

13. The blender, as recited in claim 8, wherein said container body has a single external wall for forming said blending cavity within said single external wall.

14. The blender, as recited in claim 3, wherein said container body comprises an external wall panel and an internal wall panel which is sealingly coupled with said external wall panel for forming a double wall structure of said container body, said blending cavity being formed between said internal wall panel.

15. The blender, as recited in claim 8, wherein said container body comprises an external wall panel and an internal wall panel which is sealingly coupled with said external wall panel for forming a double wall structure of said container body, said blending cavity being formed between said internal wall panel.

* * * * *